United States Patent Office 3,562,240
Patented Feb. 9, 1971

3,562,240
POLYMERIZING CONJUGATE DIENES
André Miletto, Pau, and Jean Teitgen, Arthez-de-Bearn, France, assignors to Societe Nationale des Petroles d'Aquitaine, Courbevoie, France
No Drawing. Filed Nov. 18, 1968, Ser. No. 776,789
Claims priority, application France, Nov. 20, 1967, 128,872
Int. Cl. C08d *1/24, 1/36;* C08f *1/62*
U.S. Cl. 260—94.3                                 4 Claims

ABSTRACT OF THE DISCLOSURE

Polymerization or copolymerization of conjugate dienes in aqueous emulsion is improved in that the conversion of monomer is increased up to a value of 70% to 90%, while the commercial quality of polymers obtained is the same or even somewhat better than that of conventional corresponding polymers. This result is obtained by always keeping the rate of polymerization at at least 6% of monomer per hour, until 70% to 90% of monomer are converted into polymer. The required rate is controlled by continuously introducing a polymerization catalyst system and a chain-limiting agent over the whole period of polymerization. Optionally this control is also effected by adding a supplemental amount of emulsifier to the emulsion when about the half of the monomer is polymerized.

BACKGROUND OF THE INVENTION

The polymerization or copolymerization of dienes, in emulsion in water, is well known and is at present being carried out; it takes place in the presence of one or more radical catalysts, emulsifiers and generally a chain-limiting agent, which is usually a mercaptan. Using the conventional process, it is scarcely possible to exceed a conversion of the monomer or monomers of more than 70%; generally, the operation is stopped when the conversion has reached about 60%, because at this moment the polymerization is itself considerably slowed down and, if it is sought to accelerate the polymerization by the known means, the quality of the polymers which are formed suffers as a consequence. Beyond a conversion of 60%, the conventional process is unable to provide products having suitable mechanical and dynamic characteristics: a gel appears and the polymers have too great a tendency to cross-linking, so that they are no longer suitable for certain important applications, as for example the manufacture of pneumatic tyres for vehicles. On the other hand, the distribution of the molecular masses of the polymers, which is very large in the product manufactured by the known process, is still further extended if it is desired to push the conversion beyond 60%. Finally, when the conventional process is carried out industrially, the polymerization has to be stopped at this relatively low limit, the remaining monomers being separated from the reaction medium in order to be recycled.

A recent improvement has enabled the distribution of the molecular masses to be very substantially narrowed by continuously introducing the chain-limiting agent throughout the polymerization. However, this does not protect the product of the reaction from a certain gelification when the rate of conversion is extended to more than about 60%.

DESCRIPTION OF THE INVENTION

The invention relates to the polymerization (which term includes copolymerization) of conjugate dienes in an aqueous medium; it is particularly concerned with the polymerization and copolymerization of butadiene, but it is also applicable to other dienes such as, for example, isoprene, 2,4-hexadiene, heptadienes, octadienes and haloprenes.

The present invention supplies, over the known processes, an improvement which permits the rate of conversion of the monomer or monomers into polymers to be considerably increased without harming the qualities of these polymers in any way. More especially, it enables conversion rates of the order of 80 to 85% to be reached, while nevertheless obtaining products as good as those which could hitherto only be obtained by stopping the polymerization at a conversion of about 60%. In particular, while attaining the transformation of 80% or more of monomers, the process according to the invention avoids any gel production in a proportion exceeding the permitted limit of 2%. In addition, the polymers which are obtained by this improved process show a narrower molecular distribution than that of the products prepared in emulsion according to the prior art; this permits obtaining obvious advantages.

The process according to the invention consists in carrying out the polymerization or copolymerization of conjugate dienes, in emulsion in water, with the continuous introduction of chain-limiting agent, extending the conversion of the monomer or monomers into polymers up to 70% to 90%, in the presence of proportions of radical catalysts and emulsifiers such that the average speed of this conversion from 70% to 90% remains at least equal to the average speed with which the same polymerization is normally effected when this latter is stopped at a conversion of about 60%.

The speed according to the invention is preferably 1 to 1.5 times that of the speed of the prior art in polymerization reactions of about 60%.

In the particular case of the polymerization of butadiene, the new process consists in extending the polymerization up to 70% to 90% conversion, in the presence of such proportions of catalyst and emulsifier that the average speed of polymerization amounts to at least 6% of butadiene per hour, the catalyst and the chain-limiting agent being added continuously to the reaction medium during the polymerization.

In other words, the polymerization is not stopped before 70% and the proportions of catalyst and/or emulsifier are increased, as compared with those of the prior art, in such manner that the polymerization of 70% of monomer does not last longer than 70:6=11.66 hours, and the polymerization of 80% not longer than 80:6=13.33 hours, and so on.

These special measures according to the invention are the result of the following surprising discovery: in the conventional polymerization method, in which the chain-limiting agent is all introduced on starting the operation, the acceleration of the polymerization has an unfavourable effect on the quality of the polymers; on the contrary, when the chain-limiting agent is added continuously, it is possible to reach conversion rates much higher than 60%, without excessive gel formation, provided that the introduction of the catalyst and of the limiting agent is continued in such a way as to maintain the polymerization at an average speed at least equal to that of the preceding polymerization period. This unexpected fact has led to the new conception that the overall polymerization speed, up to an amount of 70% or more, must be at least equal to that at which the operation takes place according to the prior art up to about 60%. This speed must not be below 6% of monomer per hour if it is desired to obtain good polymers for a conversion as high as 70% to 90%.

According to one preferred feature of the invention, the average polymerization speed is from 6% to 8% of monomer per hour. On the other hand, the polymerization is preferably carried on until there is transformation of 73% to 85% of the monomer.

In one particular and very advantageous case, the polymerization is effected in the presence of ferrous sulfate and paramenthane hydroperoxide, the chain-modifying agent being terdodecyl mercaptan and the emulsifier being potassium resinate. The preferred proportions of adjuvants, in respect of 100 parts per weight of butadiene, are then: 0.024 to 0.048 part of $FeSO_4 \cdot 7H_2O$, 0.07 to 0.15 part of hydroperoxide, 0.2 to 0.3 part of terdodecylmercaptan and 5 to 10 parts of resinate.

The general conditions for the polymerization according to the invention are the same as those according to the prior art; the operation more especially takes place in the cold, generally at 0° to 20° C. and better at 3° to 10° C., with an activator formed by a Redox system, comprising a reducing agent such as ferrous sulfate, formaldehyde, sodium sulfoxylate or others, and a peroxide or hydroperoxide, such as those of benzoyl, lauroyl, acetyl, etc., and more especially paramenthane hydroperoxide. As in the prior art, the chain limiter or modifier is preferably a mercaptan, particularly terdodecyl mercaptan.

As emulsifiers, it is possible to employ various surface-active agents which are known in the art, and potassium resinate is among those which are most frequently employed. When acting on the concentration of emulsifier, for increasing the speed of the end period of the polymerization, it is preferable to add the emulsifier in several portions, particularly introducing one part at the start and the remainder when the rate of conversion has reached a certain value, for example, of the order of 50%. In this way, more regular reaction kinetics are obtained. The supplement of emulsifier can optionally be added in a continuous way.

The invention is illustrated in non-limiting manner by the following Examples 2, 3 and 4, Example 1 being given in order to recall the prior art.

EXAMPLE 1

Butadiene was polymerized in aqueous emulsion in accordance with known method, but modified by the chain-limiting agent, terdodecyl mercaptan (abbreviated as "TDM") being added continuously in order to narrow the distribution of the molecular masses of the prepared polymer.

The aqueous emulsion with 33% of butadiene contained, per 100 parts by weight of butadiene:

4.56 parts of potassium resinate as emulsifier,
0.016 part of $FeSO_4 \cdot 7H_2O$ as reducing agent,
0.096 part of a 50% solution of paramenthane hydroperoxide as catalyst.

The emulsion was kept at 5° C. while stirring continuously. The catalyst was continuously introduced for 10 hours. The proportion of TDM modifier was 0.2% with respect to the butadiene: 35.7% of this quantity were introduced into the reaction medium at the start, that is to say, 0.0714 gramme, while the remaining 64.3%, i.e. 0.1286 gramme, were added continuously for 10 hours.

Under these conditions, the conversion rate was 60% in 10 hours and 80/ after 20 hours of polymerization. The average speeds of polymerization were thus:

| | Percent per hour |
|---|---|
| Up to 60% | 6 |
| From 60% to 80% | 2 |
| Overall average | 4 |

The inherent viscosity of the polybutadiene, obtained after 20 hours and determined in cyclohexane at 20° C., was 3.02 and the Mooney viscosity at 100° C. was equal to 140.

The polymer as thus obtained with 80% of conversion had a highly branched structure and contained about 4% of gel.

EXAMPLE 2

The polymerization was conducted as in Example 1, except that the proportion of activator was doubled. To 100 parts of butadiene, there were used:

0.032 parts of $FeSO_4 \cdot 7H_2O$ and
0.192 part of 50% solution of paramenthane hydroperoxide.

The catalyst was continuously introduced into the medium to be polymerized.

Relatively to the butadiene, 0.25% of modifier were used; 30.2% of this quantity, 0.0725 gram, were introduced at the start and the remaining 69.8%, 0.1675 gram, were continuously injected throughout the period of polymerization.

After 11 hours, a conversion of 73% was reached, this corresponding to an average polymerization speed of 73:11=6.6% per hour, although it was 6.4% at the moment when the conversion had reached 60%.

The polybutadiene as thus obtained had an inherent viscosity of 2.87 and a Mooney viscosity of 100 (at 100° C.). On the other hand, this polymer had a gel content less than 2%, and a degree of branching which was normal for emulsion produced polybutadienes; it had a narrow distribution of molecular masses.

EXAMPLE 3

The test was carried out under the same conditions as those of Example 2, but with 6.58 parts of potassium resinate to 100 parts of butadiene, instead of 4.56 parts as in the preceding examples.

The quantity of emulsifier was thus 1.45 times that which is normally employed.

In this polymerization reaction, 0.28% of modifier was used relatively to butadiene, and was injected in the following manner:

30.2%, 0.0846 g., at the start of the reaction and
69.8%, 0.1954 g., were injected continuously throughout the polymerization period.

After 11 hours, a conversion of 85% was reached, this corresponding to an average speed of 7.7% per hour. The polymer obtained had an inherent viscosity of 3.01 and a Mooney viscosity of 108 at 100° C.

Even at this high conversion rate and with the high speed of 7.7% per hour, the polymer had a gel content of less than 2%, a normal degree of branching and its molecular distribution was narrow.

EXAMPLE 4

The polymerization is carried out under the same conditions as in Example 3, with 6.58 parts of potassium resinate to 100 parts of butadiene, but an introduction of 4.56 parts of this emulsifier is made at the start, while the remainder, 2.02 parts, is added as soon as a monomer conversion of 50% is reached.

Relatively to the butadiene, there is used 0.24 part of modifier, of which:

30.2%, 0.0725 g., are added when starting the polymerization,
69.8%, 0.1675 g., are introduced continuously throughout the polymerization period.

After 12 hours, the conversion is 78%.
Inherent viscosity of the polymer obtained: 2.87.
Mooney viscosity of the polymer obtained: 98.
The polymer contains less than 2% of gel.

EXAMPLE 5

The polymerization of butadiene in emulsion is carried out under the general conditions of Example 2. To the reaction medium are first of all added 24% of the total quantity of TDM, 0.072 g. per 100 g. of butadiene, the remaining 76% of this modifier, 0.228 g., being introduced continuously throughout the polymerization period. Thus, altogether 0.3 part by weight of modifier is used to 100 parts of butadiene. The conversion rate of 80% is reached after 12 hours of reaction, that is to say, with an average speed of 6.7% per hour.

At this moment, the polymer has an inherent viscosity of 2.61 and a Mooney viscosity of 87. It does not show any branching and its gel content is below 2%. On the other hand, because of the introduction of he TDM continuously, the narrow distribution of the molecular masses is preserved, despite the high conversion of 80%.

The polymers obtained in the preceding examples were mixed with an aromatic oil (Sundex 890) in order to form polybutadienes extended with 37.5 parts of oil. A similar mixture was prepared with polybutadienes manufactured according to the prior art, under the conditions of Example 1, the polymerization having been stopped with a conversion of 60%.

The mechanical characteristics were determined on the vulcanized products in known manner, at 145° C. for 55 minutes, after adding 54.5 parts of HAF carbon black, 3 parts of ZnO, one part of stearic acid, 1.3 parts of sulfur, 0.7 part of special NOBS and 0.2 part of DPG to 100 parts of polymer mixture plus oil.

The measurements of the mechanical characteristics carried out on the mixtures obtained produced the following results.

| Examples | 2 | 3 | 4 | 5 | Prior art |
|---|---|---|---|---|---|
| Mooney ML₁₄ viscosity, 100° C | 51 | 55 | 51 | 41 | 43–45 |
| Tensile strength, kg./cm.² | 145 | 145 | 140 | 150 | 140–150 |
| Modulus at 300% elongation, kg./cm.² | 130 | 120 | 120 | 105 | 90–110 |
| Elongation at break, percent | 320 | 340 | 340 | 390 | 380–420 |
| Hardness | 61 | 60 | 59 | 60 | 58 |

It is seen that the products obtained according to the invention, with conversions from 73 to 85%, have the same or even somewhat better mechanical qualities as the polymers according to the prior art, manufactured with the precaution of not exceeding a conversion of 60%.

EXAMPLE 6

Polymerization of isoprene in emulsion at 5° C.

The aqueous emulsion with 33% of isoprene contained, per 100 parts by weight of isoprene:

4.93 parts of potassium resinate
0.04 part of $FeSO_4 \cdot 7H_2O$
0.192 part of 50% solution of paramenthane hydroperoxide The catalyst is continuously introduced for 10 hours. The TDM is in a proportion of 0.05% relatively to the isoprene; 52% of this quantity are introduced at the start, 0.026 g., while the remaining 48%, 0.024 g., are added continuously for 10 hours.

A conversion rate of 71% is obtained after 10 hours. The inherent viscosity of the polyisoprene thus prepared, determined in cyclohexane at 20° C., is 3.52 and the Mooney viscosity at 100° C. is equal to 102. This polyisoprene is intended to be extended with 37.5 parts of oil.

What is claimed is:

1. Method of polymerizing a conjugated diene selected from the group consisting of butadiene and isoprene in an aqueous emulsion at a temperature in the range of 0° to 20° C., said aqueous emulsion containing per 100 parts of conjugated diene 4.5 to 10 parts by weight of an alkali metal resinate as an emulsifier, a catalyst consisting of a redox system of 0.07 to 0.15 part by weight of paramenthane hydroperoxide and 0.024 to 0.048 part by weight of $FeSO_4 \cdot 7H_2O$; 0.2 to 0.3 part by weight of terdodecylmercaptan as chain limiting agent, in which said catalyst and said chain limiting agent are introduced continuously in said aqueous emulsion throughout polymerization, under stirring, carrying out the polymerization at a rate in the range from 6 to 8 percent per hour at any moment of said polymerization, and wherein said polymerization is stopped only when 70 to 90% by weight of said diene is polymerized and the polymer formed is thereafter separated from the emulsion.

2. A method as set forth in claim 1, wherein the emulsifying agent is added one portion at a time.

3. A method as set forth in claim 2, wherein the emulsifying agent is introduced partly at the start and the remainder when the conversion of the polymerization reaches a value of the order of 50% by weight.

4. Method of polymerizing butadiene or isoprene in an aqueous emulsion containing an emulsifier consisting of 4.5 to 10 parts by weight of alkali metal resinate, per 100 weight parts of diene, a catalyst formed by a redox system composed of 0.024 to 0.048 part by weight of $SO_4Fe \cdot 7H_2O$ and 0.07 to 0.15 part by weight of paramenthane hydroperoxide, and a chain limiting agent consisting of 0.2 to 0.3 part by weight of terdodecylmercaptan in which said catalyst and said agent are continuously introduced into the emulsion which is continuously stirred and kept at a temperature in the range of 3° to 10° C., to control the rate of polymerization in order that the mean amount of diene converted into polymer, per hour, during the whole polymerization, reach 6% to 8% of the starting diene, the polymerization being stopped only as 70% to 90% of the diene are polymerized.

References Cited

UNITED STATES PATENTS

| 2,584,823 | 2/1952 | Tucker et al. | 260—94.4X |
| 2,694,053 | 11/1954 | Uraneck et al. | 260—84.7 |
| 3,099,650 | 7/1963 | Boyer et al. | 260—94.4X |
| 3,510,467 | 5/1970 | Azoulay et al. | 260—94.4 |

FOREIGN PATENTS

| 216,583 | 1/1957 | Australia | 260—94.4 |
| 6,602,111 | 8/1966 | Netherlands | 260—94.4 |

JOSEPH L. SCHOFER, Primary Examiner

W. F. HAMROCK, Assistant Examiner

U.S. Cl. X.R.

260—29.7, 92.3, 94.4